US007625608B2

(12) United States Patent
Dörnen

(10) Patent No.: US 7,625,608 B2
(45) Date of Patent: Dec. 1, 2009

(54) METHOD FOR FORMING GLOSSY AND MATT ZONES DURING PRINTING OF A CAN BODY

(75) Inventor: Ulrich Dörnen, Emmerich (DE)

(73) Assignee: Boxal France, Beaurepaire (FR)

( * ) Notice: Subject to any disclaimer, the term of this patent is extended or adjusted under 35 U.S.C. 154(b) by 532 days.

(21) Appl. No.: 10/574,928

(22) PCT Filed: Oct. 5, 2004

(86) PCT No.: PCT/FR2004/002511

§ 371 (c)(1),
(2), (4) Date: Aug. 8, 2006

(87) PCT Pub. No.: WO2005/035252

PCT Pub. Date: Apr. 21, 2005

(65) Prior Publication Data

US 2007/0071897 A1 Mar. 29, 2007

(30) Foreign Application Priority Data

Oct. 9, 2003 (EP) .................................. 03405728

(51) Int. Cl.

| | |
|---|---|
| ***B05D 1/28*** | (2006.01) |
| ***B05D 5/00*** | (2006.01) |
| ***B05D 7/00*** | (2006.01) |
| ***B29B 15/10*** | (2006.01) |
| ***C23C 18/00*** | (2006.01) |
| ***C23C 20/00*** | (2006.01) |
| ***C23C 28/00*** | (2006.01) |

(52) U.S. Cl. .................................... 427/428.15; 101/40

(58) Field of Classification Search ................. 427/287, 427/278, 428.01, 428.15, 428.16; 101/40
See application file for complete search history.

(56) References Cited

U.S. PATENT DOCUMENTS 3,960,073 A 6/1976 Rush

FOREIGN PATENT DOCUMENTS

| | | |
|---|---|---|
| FR | 2 800 317 A | 5/2001 |
| GB | 1 563 834 A | 4/1980 |

*Primary Examiner*—Roberts Culbert
(74) *Attorney, Agent, or Firm*—Oliff & Berridge, PLC

(57) ABSTRACT

Method for forming glossy and matt surface zones during printing of a can body in a production line comprising:

a priming varnishing machine for applying a priming layer to the can body, a printing machine for applying printing colors including at least one glossy printing color to the can body provided with a priming layer, and a finish varnishing machine for applying a finish varnish to the can body provided with a priming layer and printed.

A matt varnish is applied as finish varnish, after drying of the inks, by means of a flexographic printing plate controlled by dot-for-dot marking or by means of a cylinder controlled by dot-for-dot marking, to the zones of the can body for the purposes of giving a matt visual aspect.

To implement the method, a conventional production line can be re-equipped with simple means.

7 Claims, 1 Drawing Sheet

METHOD FOR FORMING GLOSSY AND MATT ZONES DURING PRINTING OF A CAN BODY

BACKGROUND OF THE INVENTION

The invention relates to a method for forming glossy and matt surface zones when printing a can body in a production line comprising:

- a priming varnishing machine for applying a priming layer to the can body,
- a printing machine for applying printing colours including at least one glossy color to the can body provided with the priming layer,
- and a finish varnishing machine for applying a finish varnish to the can body provided with the priming layer and printed.

STATE OF THE ART

In the case of aerosol cans which are used for packaging products intended for example for body care or other fields of application, the product manufacturer today increasingly wants to give decorative surface effects to efficiently highlight an important surface zone of the can for the consumer, such as a logo or the letters of a graphic inscription, from the advertising point of view. The trend is today towards what is called "spot-varnish", i.e. essentially very glossy elementary zones such as the individual letters of a graphic representation, symbols, emblems, logos and the like, which are signs which stand out on a matt background or on a matt surface surrounding the signs.

The production lines used to print can surfaces currently conventionally comprise a priming varnishing machine for applying a priming layer to the body of a can, then a printing machine for printing the body of the can provided with the priming layer with one or more printing colours, and a finish varnishing machine placed downline for applying a protective or finish varnish to the printed body of the can after the inks have been bake-dried. Printing is usually performed by means of an offset printing method with printing colours or tints that form a layer with a thickness of about 2 μm on the surface of the can. A layer that is so thin is not however sufficient to give a matt effect. Consequently, present-day production lines designed for printing can surfaces do not enable very glossy zones to be achieved on a matt background to give a "spot-varnish" effect.

OBJECT OF THE INVENTION

The object of the invention is to modify a method according to the prior art, with a conventional production line comprising a priming varnishing machine, a printing machine and a finish varnishing machine, so that a conventional production line can be re-equipped with simple means for printing can bodies with glossy and matt surface zones.

The object of the invention is achieved in that a matt or special effect varnish is applied as finish vernish, after drying of the inks, by means of a flexographic printing plate controlled by dot-for-dot marking or by means of a cylinder controlled by dot-for-dot marking, to the zones of the can body designed to give a matt surface.

The heart of the invention is based on marking and delineating matt surface zones with a high precision with respect to the other very glossy printing surfaces by suitably applying a layer of matt varnish to the printed can, after drying of the inks.

The zones designed to give a glossy surface are usually printed with a glossy printing color. However, the very glossy surface zones can also be formed from a glossy can surface, which can for example be obtained by means of smoothing brushes.

The method of the invention is above all suitable for printing aluminium or aluminium alloy can bodies or tinplate cans such as cylindrical monoblock tinplate bodies that may comprise a swaged cone.

Preferentially, the flexographic printing unit is equipped with an inking distributing mechanism (anilox roll). However, other varnishing machines suitable for varnishing can bodies can also be used.

The method according to the invention is particularly suitable for giving a "Spot-Varnish" effect to the can body surfaces.

BRIEF DESCRIPTION OF THE DRAWINGS

Other advantages, features and particularities of the invention will become clearly apparent from the following description of preferred embodiments and from the accompanying drawings in which.

DESCRIPTION OF PARTICULAR EMBODIMENTS

Figure 1:
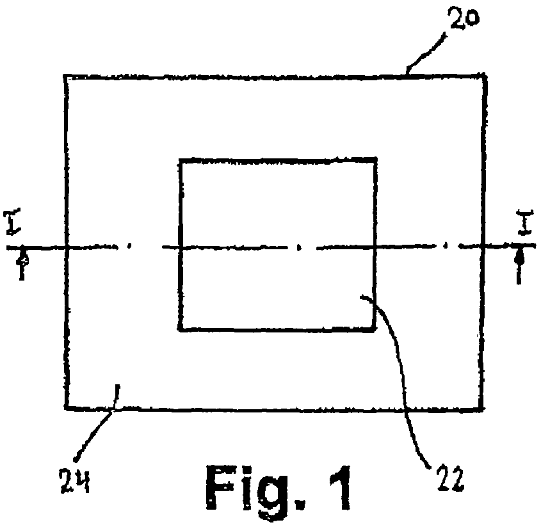
FIG. 1 is a top view of the developed cylindrical wall of a printed can body presenting glossy and matt surface zones.

FIG. 1 represents a developed cylindrical wall 20 of a can body 18 that comprises a glossy surface zone 22 and a matt zone 24 that surrounds it completely. The glossy zone corresponds for example to the letters of a graphic inscription, to a symbol, an emblem, a logo or another element that has to be highlighted by a particular glossy effect. The matt zone 24 corresponds for example to the remaining can surface and underlines the glossy effect of the elements to be highlighted, which results in the effects summed up by the term "Spot-Varnish".

Figure 2:
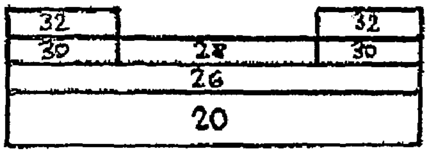
FIG. 2 is a cross-sectional view of the developed cylindrical wall of FIG. 1 along the line I-I.

As represented in FIG. 2, the whole surface of the cylindrical wall 20 of a can 18, for example made of aluminium, is covered by a transparent priming layer 26, also called priming varnish. The can body 18 can be manufactured from aluminium or an aluminium alloy or from tinplate so as to obtain for example a cylindrical monoblock tinplate body that may comprise a swaged cone. A first printing, with a very glossy printing color or tint 28 and a second printing, adjacent to the first printing, with a standard printing color or tint 30 are performed on the priming layer 26. A matt varnish 32 in the form of a layer of finish varnish is deposited on the second printing of the standard printing color 30. No other layer is applied to the first printing of very glossy printing color 28.

The protective function of a layer of finish varnish is performed here by the very glossy printing layer 28 chosen specially for this purpose.

Figure 3:
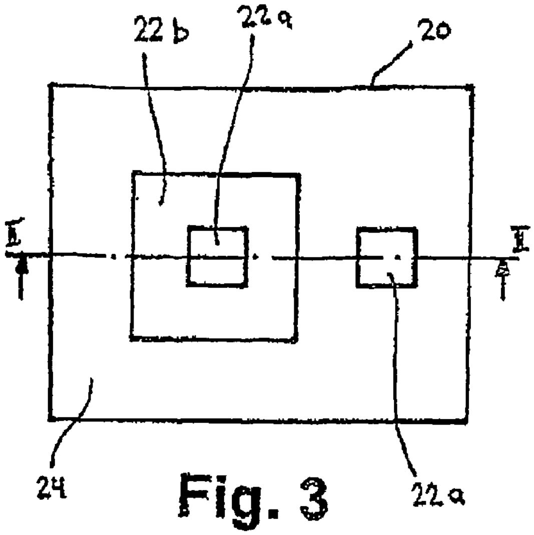
FIG. 3 is a top view of the developed cylindrical wall of a printed can body presenting another arrangement of glossy and matt surface zones.

In the case of the can wall 20 represented in FIG. 3, a first glossy surface zone 22*a* is surrounded by a second glossy zone 22*b*. Another part of the first glossy zone 22*a* is located outside the second glossy zone 22*b*. The remaining surface of the can wall 20 is covered by a matt zone 24.

Figure 4:
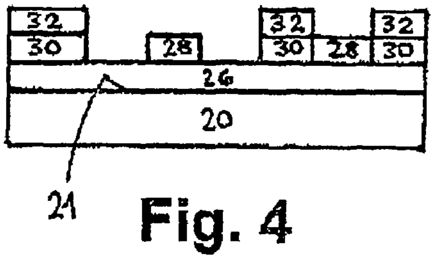
FIG. 4 is a cross-sectional view of the developed cylindrical wall of FIG. 3 along the line I-I.

As represented in FIG. 4, the can wall 20 already comprises a very glossy surface 21. In the case of an aluminium can body 18, this glossy effect can be obtained by a surface smoothed with a brush. The whole glossy surface 21 of the can wall 20 is also varnished here with a priming layer 26. A first printing with a very glossy printing color 28 is deposited on the priming layer 26 in correspondence with the two parts of the first glossy zone 22*a*. A second printing with a standard printing color 30 is performed in correspondence with the matt zone 24. The second glossy zone 22*b* corresponds to the glossy effect by transparency of the aluminium surface 21 with a very glossy finish. The second printing of the standard printing color 30 is covered by a matt varnish 32.

The process stages necessary for printing a can body 18 presenting glossy and matt surface zones are explained in detail in the following referring to FIGS. 5 and 6.

Figure 5:
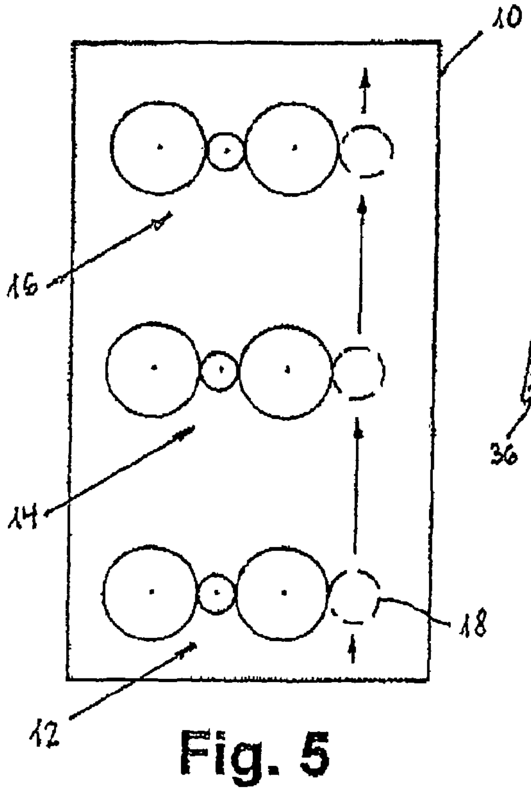
FIG. 5 represents a production line comprising a priming varnishing machine, a printing machine and a finish varnishing machine designed to print the cylindrical wall of a can body.

A production line 10, represented in FIG. 5 and designed to print the cylindrical wall 20 of the can body 18, comprises a priming varnishing machine 12, followed by a printing machine 14 and then a finish varnishing machine 16 downline. The priming varnishing machine 12 applies the priming layer or priming varnish 26 to the can body 18. The printing machine 14 prints the can body 18 provided with the priming layer with printing colours 28, 30 and the finish varnishing machine 16 applies the matt varnish 32 to the can body provided with the priming layer and printed, after drying of the inks.

Given that the matt varnish 32 has to cover the predetermined matt zones 24 completely and that the glossy zones 22 have to be left completely apparent, application of the matt varnish 32 is performed by the flexographic printing method by means of a flexographic printing plate or by means of a cylinder 44, on the zones that are marked dot-for-dot with respect to the already printed can body 18, after drying of the inks, for precise application of the matt varnish 32.

Figure 6:
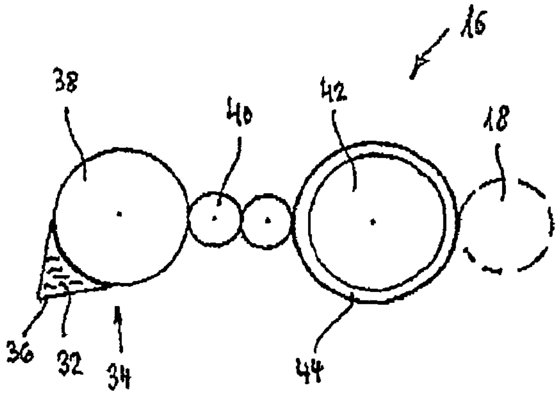
FIG. 6 represents a detail of the finish varnishing machine of FIG. 5.

In the finish varnishing machine 16, represented in FIG. 6 and comprising an inking distributing mechanism also called "anilox" 34, a distributing roll 38 rotates in front of a varnish compartment 36 filled with matt varnish 32. The matt varnish 32 is transferred from the distributing roll 38, via one or more adjustable dosing rolls 40, to the flexographic printing plate 44 mounted at the periphery of a printing cylinder 42 or directly on the cylinder. The matt varnish 32 is transferred from the flexographic printing plate 44 or from the cylinder to the printed can body 18, in a manner controlled by dot-for-dot marking.

The priming varnishing machine 12 can be equipped with a flexographic printing mechanism according to FIG. 6, as can the finish varnishing machine 16. An elastomer-coated cylinder can be systematically used instead of the cylinder 42 equipped with a fixed flexographic printing plate 44. The printing machine 14 comprises a number of printing elements corresponding to the number of printing colours.

The invention claimed is:

1. A method for forming glossy and matte surface zones when printing a can body in a production line, the method comprising:

applying a primer layer to the can body using a primer varnishing machine, applying printed colors to the can body with the primer layer using a printing machine, the printed colors comprising at least one glossy color, and applying a finish varnish to the can body provided with the primer layer and printed color using a finish varnishing machine, wherein a matte varnish is applied as the finish varnish to the zones of the can body designed to give a matte surface after the glossy color is dry via a flexographic printing plate controlled by dot-for-dot marking or via a cylinder controlled by dot-for-dot marking.

2. The method according to claim 1, wherein the glossy surface zones are formed with a glossy printed color.

3. The method according to claim 1, wherein the glossy surface zones are formed by a glossy can surface.

4. The method according to claim 3, wherein the can surface is rendered glossy by brush smoothing.

5. The method according to claim 1, wherein the can body is manufactured from aluminium or from an aluminium alloy or from tinplate.

6. The method according to claim 1, wherein the primer varnishing machine and the finish varnishing machine are equipped with a flexographic printing unit and with an ink distributing mechanism.

7. The method according to claim 1, wherein the method is applied to form a "Spot-Varnish" effect on the surface of the can body.

* * * * *